United States Patent

[11] 3,629,065

| [72] | Inventor | William M. Knox<br>Schenectady, N.Y. |
|---|---|---|
| [21] | Appl. No. | 844,041 |
| [22] | Filed | July 23, 1969 |
| [45] | Patented | Dec. 21, 1971 |
| [73] | Assignee | The United States of America as represented by the United States Atomic Energy Commission |

[54] APPARATUS FOR INCREASING POWER DENSITY IN A BOILING LIQUID NUCLEAR REACTOR
2 Claims, 2 Drawing Figs.

[52] U.S. Cl. ................................................ 176/54,
176/57, 176/73, 176/68, 176/72, 176/81
[51] Int. Cl. ........................................................ G21c 3/04,
G21c 15/06
[50] Field of Search ............................................ 176/54–57,
73, 77, 72, 68, 81

[56] References Cited
UNITED STATES PATENTS

| 2,990,349 | 6/1961 | Roman ........................ | 176/42 |
| 3,033,773 | 5/1962 | Schluderberg et al. ....... | 176/43 |
| 3,063,925 | 11/1962 | Huet ........................... | 176/54 |
| 3,070,537 | 12/1962 | Treshow ...................... | 176/78 |
| 3,177,123 | 4/1965 | Huet ........................... | 176/54 X |
| 3,072,555 | 1/1963 | Barth et al. ................. | 176/54 |
| 3,339,631 | 9/1967 | McGurty et al. ............. | 176/54 X |
| 3,378,453 | 4/1968 | Gorker ........................ | 176/54 X |
| 3,420,737 | 1/1969 | Marchal et al. .............. | 176/56 |

*Primary Examiner*—Benjamin R. Padgett
*Assistant Examiner*—E. E. Lehmann
*Attorney*—Roland A. Anderson

ABSTRACT: The power output of a boiling liquid reactor is increased by providing means for forming a vortex within the boiling zone of coolant channels.

PATENTED DEC 21 1971 3,629,065
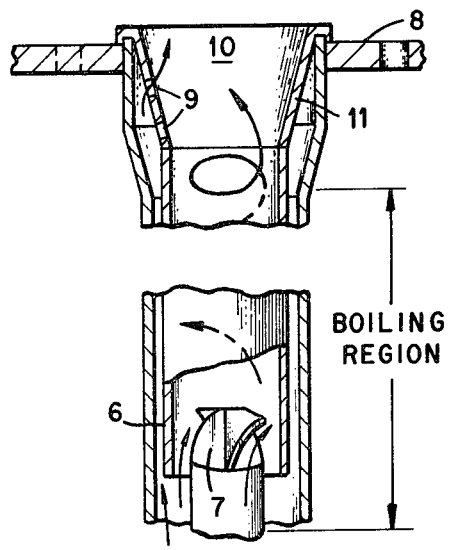
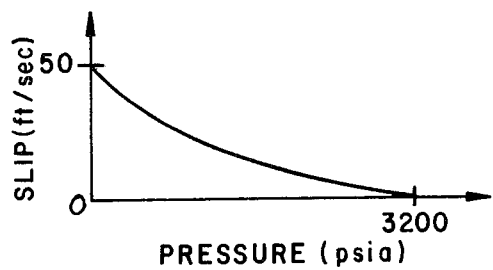
Fig. 2
Fig. 1
INVENTOR.
William M. Knox
BY
Roland A. Anderson
ATTORNEY.

APPARATUS FOR INCREASING POWER DENSITY IN A BOILING LIQUID NUCLEAR REACTOR

BACKGROUND OF THE INVENTION

The invention described herein was made in the course of, or under, a contract with the U.S. Atomic Energy Commission.

My invention relates generally to boiling liquid nuclear reactors and more particularly to means for increasing the power density of boiling water nuclear reactors.

The power output of a given boiling water reactor design is essentially limited by the void fraction of the steam within the reactor core. Above a certain critical void fraction, the time variance of the reactivity of the core caused by the variance in the spatial distribution of the steam voids results in undesirable oscillations of the core power. Hence, in practice the boiling water reactor is operated at a void fraction slightly below this critical amount.

The limitation on power arises from the fact that, at the maximum allowable void fraction established for a given core design and a slip (difference between the steam velocity and water velocity in the core fuel coolant channels) established by the geometry and operating conditions of a specific core design, the energy efflux from the core is uniquely determined.

Although power densities increase in boiling water reactors as the operating pressure is increased with a constant steam void fraction, the changes observed are not in the same proportion as the increase in the energy content of steam. This is due to the fact that at higher pressures, slip between the water and steam in the channels heated by the nuclear fuel decreases with increasing pressure; and, the net effect is a reduction in the flux of energy per unit time at the channel outlet due to steam alone.

SUMMARY OF THE INVENTION

Therefore, it is an object of this invention to provide a method for increasing the slip between the water and steam.

Another object of this invention is to increase the power density in a boiling liquid nuclear reactor.

A further object of this invention is to provide for more stable operation of boiling liquid reactor.

In accordance with my invention I have provided an improvement in a boiling liquid nuclear reactor having members defining coolant flow channels in heat transfer relationship with nuclear fuel, said coolant flow channels having liquid inlet means, liquid and vapor outlet means, a nonboiling zone adjacent said inlet means, and a boiling zone adjacent said outlet means, said improvement comprising means for forming a vortex in said coolant channel within said boiling zone.

The objects of my invention are achieved by increasing the slip between the liquid and vapor within the coolant channels of the reactor core. The vortex action causes the liquid to move to the outside of the coolant channel by centrifugal force while the lighter vapor tends to separate into the center of the tube where it can more easily rise through the coolant channel. Under these conditions the vapor can now move more rapidly out of the coolant channel, and the reactor core can be operated at higher heat fluxes. Also, more stable operation of the reactor will result because there is now a more uniform spatial distribution of vapor and liquid within the reactor.

BRIEF DESCRIPTION OF THE DRAWINGS

In the drawings FIG. 1 is a sectional view of a typical boiling liquid nuclear reactor coolant channel showing one embodiment of the subject invention; and FIG. 2 is a graph showing the relationship between slip velocity and pressure in the coolant channel of a boiling water reactor.

Referring to FIG. 2, it is readily seen that the slip velocity of steam in a coolant channel decreases with increasing pressure; and, consequently, where the pressure is lower the slip velocity is higher. A vortex is characterized by a whirling mass of fluid with a vacuum or lower pressure in the center of the mass. Thus, the present invention provides vortex conditions in the boiling region of a nuclear reactor so that the liquid mass whirls in contact with a heated tubular surface, and the vapor or steam moves to the center of the channel.

DESCRIPTION OF THE PREFERRED EMBODIMENT

FIG. 1 shows an embodiment of my invention wherein shroud 2 forms a coolant passage within a boiling liquid nuclear reactor. Shroud 2 is tubular in shape and is held in place by lower supporting grid plate 1 and upper grid 8. A plurality of shrouds 2 in a regular compact array comprise the core region of the nuclear reactor with the interstitial spacing being filled with neutron moderator and control elements.

Liquid coolant enters the coolant passage through orifice 3 and flows around fuel rod 5 which is held in place by fuel element support 4. The fuel rod 5 may be a fuel rod having a stainless steel or zirconium cladding enclosing enriched uranium dioxide fuel pellets.

The coolant flows upwardly around fuel rod 5 and is thereby heated. The fuel rod 5 extends to the point in the coolant passage where the temperature of the coolant has been raised to its boiling point. This point is determined by the power level of the reactor, the pressure and the inlet temperature of the coolant.

Attached to the upper end of fuel rod 5 is means for forming a vortex 7. The vortex forming means shown is shaped like an auger or a screw. The vortex forming means 7 extends into fuel tube 6 and imparts spiral or vortex flow to the coolant within the tube. The tube 6 is clad on both its inner and outer peripheries by stainless steel or zirconium and a fissionable material, uranium dioxide in a stainless steel zirconium or zirconium oxide matrix, is contained within the tube wall. The liquid coolant is whirled against the tube wall by vortex forming means 7. The heat transfer is increased by this means since only unevaporated liquid contacts the heated surface. Thus, only single phase convection or nucleate boiling takes place at the tube surface and the possibility of partial film boiling is essentially eliminated.

The vapor-liquid mixture leaves the fuel tube 6 through outlet 10. Liquid and vapor which have collected in the space between shroud 7 and fuel tube 6 can escape through orifices 9. The fuel tube 6 is carried by end piece 11. Lateral supporting means to give stability to the fuel rod 5 and fuel tube 6 can be provided but are not shown.

Adapting the present invention to a large boiling water power reactor having a core diameter of 10.7 feet and a height of 9.9 feet with a coolant inlet temperature of 505° F. at a pressure of 1015 p.s.i.a. and operating at about 700 mwt., the saturation or boiling conditions will occur about 5 feet above the core inlet. This is the point at which the vortex producer 7 is placed. Under these design conditions the coolant inlet velocity will be about 4.5 ft./sec. As a result of expansion of the coolant the velocity will increase to 4.75 ft./sec. at the vortex producer. Here, the coolant water is tangentially accelerated within the fuel tube 6. The steam that has begun to form receives less tangential acceleration because of its lower density and separates into the center of the tube. The slip velocity, or velocity of steam relative to water, increases because of reduced viscous drag on the steam bubbles in the center of the fuel tube 6.

Although it is theoretically possible to design the vortex producer 7 such that complete separation of the steam and water occurs, in order to estimate the potential effect of this invention upon the allowable power output of the core it will be conservatively assumed that the vortex action only results in coalescence of the steam bubbles at the center of the fuel tube 6. In this case, the relative velocity of steam bubbles, or slip, will be determined by Newton's law of Resistance, and the slip will be proportional to the square root of the frontal diameter of the bubble:

$$\text{Slip} = V_s \sim \sqrt{d}$$

Where:
 $d$ = frontal diameter of steam bubble; and
 $V_s$ = velocity of steam relative to water.

As is well known (See *Boiling Water Reactors*, by Kramer, page 148, Addison-Wesley Publishing Co., 1958.), the power density in a boiling water reactor is given by:

$$P = \rho_L \bar{V}_L \left( \frac{V_S + V_L}{V_L} \right) \left( \frac{\alpha_e}{1 - \alpha_e} \right) \left( \frac{\rho_S}{\rho_L} h_{fg} \right) \left( \frac{L}{L_b} \right)$$

where:
 $P$ = Average power density, power per unit volume of core.
 $V_L$ = Circulation velocity or velocity of water at core inlet.
 $V_L$ = Velocity of water at core exit.
 $\alpha e$ = steam volume fraction at core exit.
 $h_{fg}$ = Latent heat of water.
 $\rho_s$ = Saturated steam density.
 $\rho_L$ = Density of water.
 $L$ = Total length of core channel.
 $L_b$ = Length of boiling portion of core channel.

The circulation velocity is dependent only on the void fraction; it is not significantly affected by pressure or length of the boiling channel. Assuming that: (1) the core containing the vortex producers 7 and fuel tube 6 is designed with the same boiling length; and (2) the same void fraction and operating pressure of 1015 p.s.i.a. then, the power density (kw./liter) of the core, for the system described, is directly proportional to the slip, and the allowable increase in power due to the postulated action of the vortex producer becomes:

$$\frac{P_1}{P_2} = \frac{\left(1 + \frac{V_S}{V_L}\right)_1}{\left(1 + \frac{V_S}{V_L}\right)_2}$$

Where
 subscript 1 = Conditions with vortex producer.
 subscript 2 = Conditions without vortex producer.
Since the void fraction is the same, $V_{L1} = V_{L2}$ and $$\frac{P_1}{P_2} = \frac{(V_S + V_L)_1}{(V_S + V_L)_2}$$

For the specific core given above, the slip velocity is about 3 ft./sec. Assume that $V_s \cong V_L$, then:

$$P_1/P_2 \cong V_{s1}/V_{s2} = \sqrt{d_1/d_2}$$

Hence, increasing the average size of the steam bubbles by 10 percent will increase the slip by a factor of: $\sqrt{1.1} = 1.047$.

The allowable power increases proportionately:
 $P_1/P_2 = 1.047$
And, for the core given above, the allowable power is increased to:
 $P_1 = 1.047 P_2$
 $= (1.047)(700)$
 $= 733$ mwt.

The increase achieved in slip velocity by the present invention is dependent on the tangential acceleration of the liquid since the greater the rotational velocity of the liquid the greater the vacuum or pressure drop in the center of the fuel tube 6. Varying the pitch or the number of turns per unit length of the vortex producer 7 or varying the total number of turns can increase or decrease the tangential acceleration and prolong the vortex flow conditions up the fuel tube 6. One or more additional vortex producers may be located upstream to promote and ensure continuing vortex flow to the channel exit. Also, alternating the embodiment of FIG. 1 may prove advantageous to the reactor designer for some applications. Thus, provision may be made for a fuel rod-vortex producer-fuel tube combination followed by a second or third such combination as the particular core requires.

What I claim is:

1. In a boiling liquid nuclear reactor having members defining coolant flow channels in heat transfer relationship with a nuclear fuel element, said coolant flow channels having liquid inlet means, liquid and vapor outlet means, a nonboiling zone adjacent said inlet means, a boiling zone adjacent said outlet means, and means for forming a vortex in said coolant channels within said boiling zone, the improvement wherein said nuclear fuel element comprises a nuclear fuel rod having means at one end for forming said vortex positioned partially within said nonboiling zone of the reactor, and a nuclear fuel tube positioned in said channel with its lower end immediately above the upper end of said fuel rod, said nuclear fuel tube having an inner diameter greater than the diameter of said fuel rod.

2. The reactor of claim 1 wherein said means for forming a vortex extends partially into said tubular fuel element.

* * * * *